US006999434B1

(12) United States Patent
Agrawal et al.

(10) Patent No.: US 6,999,434 B1
(45) Date of Patent: Feb. 14, 2006

(54) METHOD, SYSTEM AND CIRCUITRY FOR SOFT HANDOFF IN INTERNET PROTOCOL-BASED CODE DIVISION MULTIPLE ACCESS NETWORKS

(75) Inventors: Prathima Agrawal, New Providence, NJ (US); Shinichi Baba, Morristown, NJ (US); Tadahiko Maeda, Summit, NJ (US); Tao Zhang, Fort Lee, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 724 days.

(21) Appl. No.: 09/723,366

(22) Filed: Nov. 28, 2000

(51) Int. Cl.
*H04Q 7/00* (2006.01)

(52) U.S. Cl. .................... 370/331; 370/466; 455/442

(58) Field of Classification Search ............... 370/331, 370/338, 401, 465, 466; 455/432.1, 432.2, 455/436, 437, 438, 442
See application file for complete search history.

(56) References Cited

U.S. PATENT DOCUMENTS

| | | | | |
|---|---|---|---|---|
| 5,278,892 | A * | 1/1994 | Bolliger et al. | 455/442 |
| 6,230,012 | B1 * | 5/2001 | Willkie et al. | 455/435.1 |
| 6,256,501 | B1 * | 7/2001 | Tokuyama et al. | 455/442 |
| 6,289,008 | B1 * | 9/2001 | Sakamoto et al. | 370/331 |
| 6,314,098 | B1 * | 11/2001 | Masuda et al. | 370/392 |
| 6,347,091 | B1 * | 2/2002 | Wallentin et al. | 370/437 |
| 6,366,561 | B1 * | 4/2002 | Bender | 370/238 |
| 6,466,556 | B1 * | 10/2002 | Boudreaux | 370/331 |
| 6,570,871 | B1 * | 5/2003 | Schneider | 370/356 |
| 6,654,359 | B1 * | 11/2003 | La Porta et al. | 370/328 |
| 6,661,996 | B1 * | 12/2003 | Wiedeman et al. | 455/12.1 |
| 6,747,961 | B1 * | 6/2004 | Ahmed et al. | 370/328 |
| 6,765,896 | B1 * | 7/2004 | Ahmed et al. | 370/338 |

FOREIGN PATENT DOCUMENTS

| | | | |
|---|---|---|---|
| EP | 1009141 A1 | * | 6/2000 |
| EP | 1094647 A2 | * | 4/2001 |

OTHER PUBLICATIONS

Kim, Yong-I et al. "Mobility Management and Routing Algorithms for Soft Handoff in Wireless Mobile Data Network Using MGCP". Vehicular Technology Conference. IEEE VTS-Fall VTC. Sep. 24-28, 2000. vol. 2. pp. 924-928.*

Wang, H.J. et al. "A Signal System Using Lightweight Call Sessions". Nineteenth Annual Joint Conference of the IEEE Computer and Communications Societies. INFOCOM. Mar. 26-30, 2000. vol. 2. pp. 697-706.*

(Continued)

*Primary Examiner*—John Pezzlo
*Assistant Examiner*—Donald L Mills
(74) *Attorney, Agent, or Firm*—Joseph Giordano; James W. Falk

(57) ABSTRACT

Method, system, and circuitry for successfully completing soft handoff in an Internet Protocol (IP) based autonomous base station wireless Code Division Multiple Access network, wherein processing is done at the serving base station so that target base stations need only set up the channel for transmitting the copied data needed for soft handoff. Concomitant circuitry comprises packet data multiplexers/assemblers and demultiplexers/de-assemblers for performing cross-layer switching. Data packets are sent by a serving base station to a mobile unit while the mobile is in a soft handoff region. The serving base station also sends copies of the data packets to target base stations, the target base stations in turn relay these data packets to the mobile. The mobile synchronizes the copies of the data packets received and combines the packets to recover the data.

6 Claims, 9 Drawing Sheets

OTHER PUBLICATIONS

Laurence B. Milstein, "Wideband Code Division Multiple Access", IEEE Journal on Selected Areas in Communications, vol. 18, No. 8, Aug. 2000, pp. 1344-1354.

Charles E. Perkins, "Mobile IP", IEEE Communications Magazine, May 1997, pp. 84-99.

3rd Generation Partnership Project 2, http://www.3gpp2.org/text/background, pp. 1-4.

Ntl Group, "The Digital Radio Service", http://www.ntl.com/guides/digitalradio/anoraks/, pp. 1-12.

TIA/EIA/IS-2000.1-A, "Introduction for CDMA 2000 Standards for Spread Spectrum Systems", Mar. 2000.

C. Perkins, "IP Mobility Support", Network Working Group, http://www.rfc-editor.org, Oct. 1996, pp. 1-69.

Information Sciences Institute—University of Southern California, "Internet Protocol", DARPA Internet Program—Protocol Specification, http://www.rfc-editor.org, Sep. 1981, pp. 1-45.

* cited by examiner

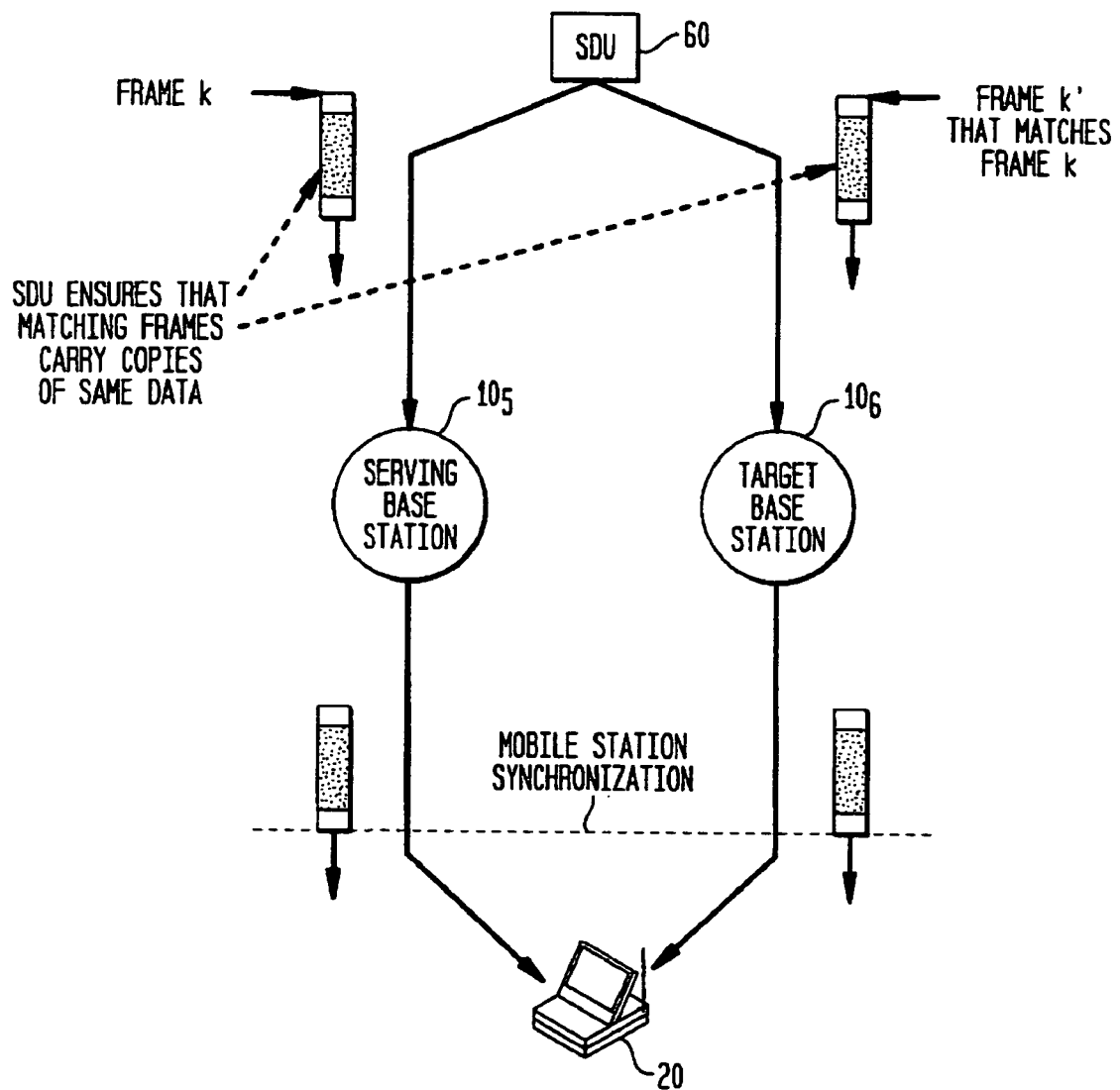

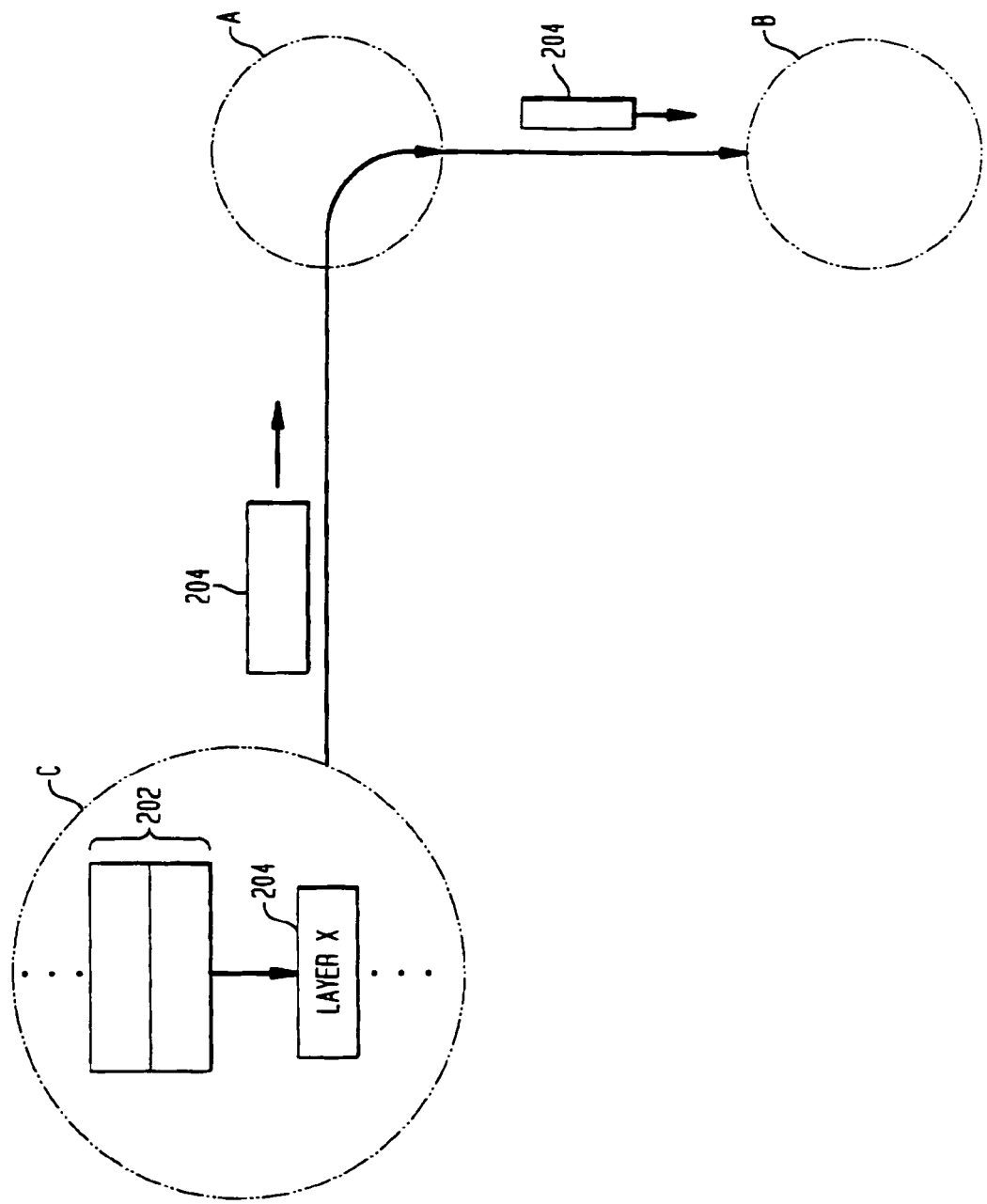

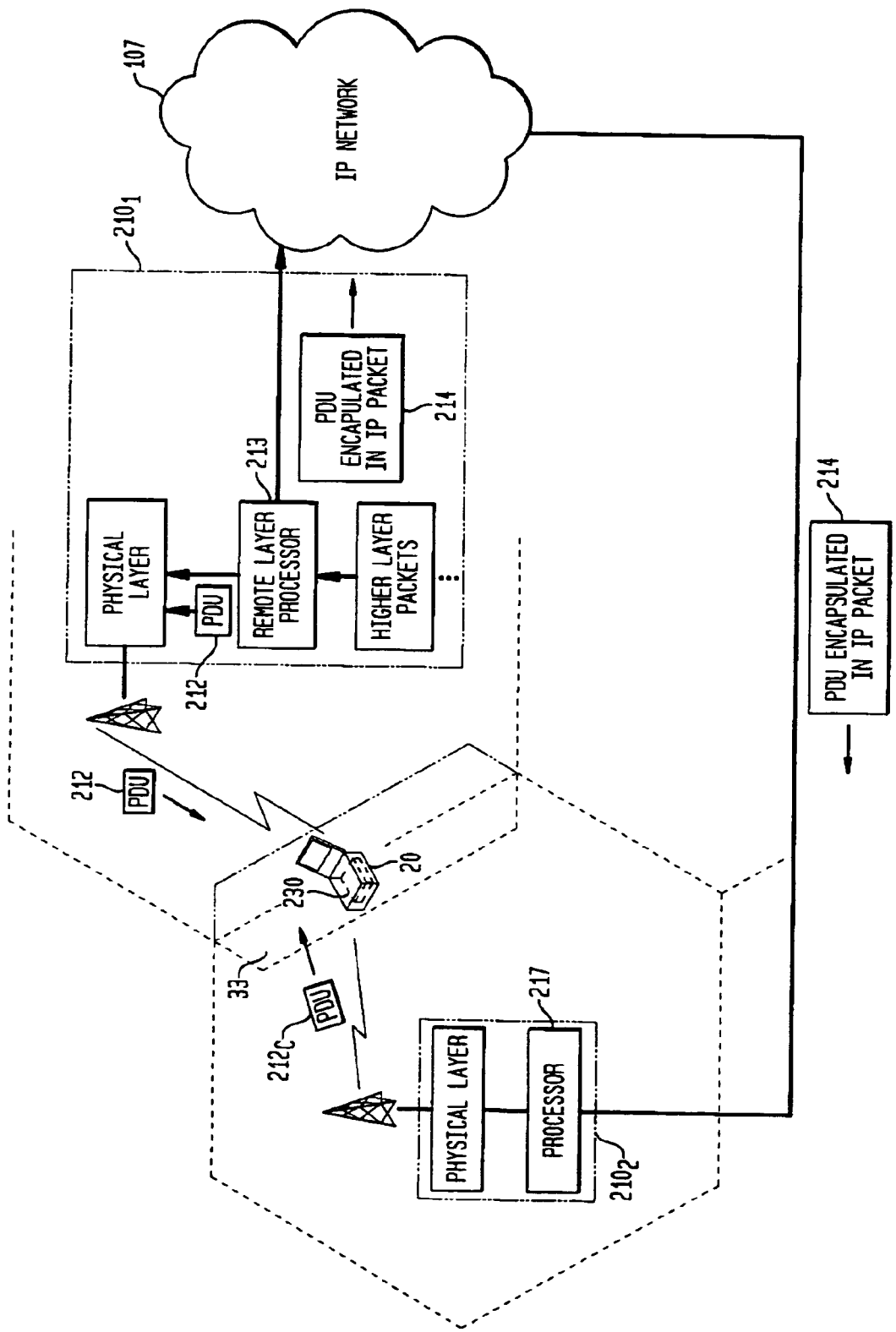

METHOD, SYSTEM AND CIRCUITRY FOR SOFT HANDOFF IN INTERNET PROTOCOL-BASED CODE DIVISION MULTIPLE ACCESS NETWORKS

FIELD OF THE INVENTION

This invention generally relates to provision of services in mobile wireless Internet Protocol (IP) networks and specifically relates to allowing mobility of service for subscribers in such wireless networks.

BACKGROUND

Two recent technological hallmarks have been the development of the personal computer and the wireless mobile telephone or cellular phone. In fact, the last ten years of the twentieth century have been marked by unprecedented growth in the demand for personal computers, particularly laptops, and wireless telephones (or cell phones). The personal computer owes its popularity mainly in part to its ability to access and process relatively large amounts of data, its price, and its size, especially in the case of laptops. Specifically, a personal computer allows for accessing and processing large amounts of multimedia information available, for example, via the Internet from the top of a desk or the lap of a user. Consumers via Internet access can send and receive email messages, preview movies, research intended purchases, etc. In essence the Internet and personal computer have made the consumer smarter through access to a heretofore unimaginable plethora of information.

Cell phones, on the other hand, have allowed users mobility previously unavailable by wireline phones. Specifically, whereas a wireline phone restricts the user's mobility to the location of the phone, a user may make and receive calls from a cell phone even while roaming over a very large geographical area such as the contiguous United States. In addition, as the user roams geographically the quality of service is maintained at a fairly high level.

Merging the mobility of the cellular network with the information capability and accessibility of the Internet has become a main focus of the communications industry. In particular, in recent years considerable research has been directed to developing mobile protocols that would allow seamless access to the multimedia services available on the Internet thereby allowing consumers access anytime and anywhere.

The Internet is a packet data network in which the Internet Protocol (IP) defines the manner in which a user is connected to the Internet so as to access, transmit, and receive information from other users or resources connected to the Internet. In particular, in accordance with IP each network access point is identified by an IP address. When a user attaches to a particular network access point the user (more precisely, its terminal) is given an IP address. The addresses available at access point are assigned geographically. Consequently, as a user roams geographically the user's point of attachment to the network changes which in turn requires the user's IP address to change. Further, information destined for a user, or resource, is packetized with each packet having the IP address of the user, more accurately the user's terminal, in a header. As packets traverse the network, the IP address included in the header is used to route the packet to its destination. Thus, as a user roams and her IP address changes, the route to the user changes which in turn may affect the quality of service for some multimedia services, i.e., real time services, as there is no guarantee that network resources required to support the service are available. At a fundamental level IP was not designed with mobility in mind as evidenced by the manner in which IP addresses are assigned.

In contrast, the wireless telephone network is a circuit switched network with each user's telephone number serving as a unique access identifier. Consequently, as the user roams geographically the user's identity is unchanged thereby allowing the network to easily track the user's movement, establish new circuits in anticipation of the user moving to a different geographic region, and maintain the needed quality of service. In addition, in the wireless telephone network calls between users are routed through the network on circuits that are established for the duration of the call. In other words, a path is established in the network for exclusively carrying each call thereby assuring the user of the bandwidth needed for the service.

Given the fundamentally different approaches underlying the manner in which access is provided by the Internet and by the wireless telephone network and the manner in which paths are established and signals routed through each of these networks, many issues need to be resolved before multimedia services can be provided over an IP wireless Code Division Multiple Access (CDMA) network. Nonetheless, forecasts indicate that users or consumers will ultimately desire accessing currently available and future multimedia services available via the Internet while being mobile, i.e., combining the cell phone mobility with the processing power of the personal computer. As such, there has been an international effort to provide mobile access to Internet protocols.

Responding to this apparent demand, the International Telecommunications Union (ITU) promulgated International Mobile Telecommunications—2000 (IMT-2000) global standards to allow for wireless access to multimedia information or services available via the Internet in much the same way consumers are use to using their cell phones, so called third generation wireless (3G wireless) services. The IMT-2000 standards have made significant progress in defining a common radio system architecture, including services, interfaces, and radio spectra. For example, at the physical layer, IMT-2000 includes standards on the frequency of the chip sets used to support the services and the radio frequency spectrum, which will be used for the services. By physical layer we refer to the first layers of the 7-layer Open System Interconnect (OSI) reference model wherein the layers are ordered as follows: layer 1 is the physical layer and the lowest layer in the stack, layer 2 is the link layer and above layer 1, layer 3 is the network layer and above layer 2, layer 4 is the transport layer and above layer 3, layer 5 is the session layer and above layer 4, layer 6 is the presentation layer and above layer 5, and layer 7 is the applications layer and the highest layer. IMT-2000 includes definitions on upper layer protocols, but mostly for circuit based networks. IMT-2000 also includes standards on Time Division Multiple Access (TDMA) and Code Division Multiple Access (CDMA) technologies.

There are two basic CDMA standards that have been identified under the IMT-2000 standard, Code Division Multiple Access (CDMA) 2000 and Wideband-CDMA (W-CDMA), for third generation wireless networks. The ITM-2000 standards in turn have spawned numerous industry organizations and groups all with the general goal of developing applicable technical specifications for supporting CDMA 2000, W-CDMA, and third generation TDMA systems. Some of these organizations include the $3^{rd}$ Generation Partnership Project (3GPP), the $3^{rd}$ Generation Partnership Project 2 (3GPP2) and the Mobile Wireless Internet Forum (MWIF). These organizations are directing their efforts to solving the problems that will be encountered in trying to provide 3G wireless multimedia services or mobile access to Internet services.

Of particular import to the present invention is the function or feature within a wireless network called soft handoff. In a conventional prior art wireless network such as shown in FIG. 1A, a plurality of base stations 10 of which base stations $10_1$ and $10_2$ are depicted transmit or send information over the air to a plurality of mobile units 20. The range within which a mobile unit 20 (can reliably receive information from a base station 10 defines a cell 21. As illustrated in FIG. 1A the cells $21_1$, $21_2$, $2_3$ - - - $21_k$ may be depicted as a honeycomb structure. As a mobile unit $20_2$ for example, roams and moves further away from a base station $10_2$ corresponding to cell $21_2$ for base station $10_2$, signal strength decreases. Further, as the mobile moves from one cell to another, the mobile station needs to switch from the serving base station, the base station for the cell it currently is in, to a target base station, the base station for the cell that it is moving to. The process of the mobile switching base stations is known as handoff.

Handoff can be hard or soft. In a hard handoff a user may receive data from only one base station at any given time. In other words, there is a single wireless data transport path for a user at any given time and the path has to change when the user moves from one cell to another. This could cause data in transit, e.g., data that has been sent to the previous serving base station, to be lost during hard handoff therefore causing performance degradation.

In a soft handoff, the user seamlessly switches from one base station to the next without any perceptible degradation in service. During a soft handoff a mobile user communicates with multiple base stations simultaneously. Therefore, a user may be able to switch to a new base station without data loss. Soft handoff is the method of choice employed in the conventional CDMA wireless network. In addition, soft handoff must be supported in 3G wireless networks, as it would be awfully inconvenient for a user's service, e.g., a video conference, to be disrupted each time the user switches base stations.

In addition to providing for seamless service, soft handoff also allows cells to cover a larger geographic area. This is the case because during soft handoff the mobile unit receives signals from at least two base stations and combines these received signals to obtain the information intended for the user. Because it receives two or more signals, each signal can be at a lower level than if the mobile were receiving only one signal. Accordingly, each base can be allowed to cover a larger geographic area.

The network of FIG. 1B is currently able to support cellular telephony and limited data transmissions, e.g., 9.6 kb/s for GSM and 14.4 kb/s for CDMA, and is usually referred to as 2G wireless network. With reference to FIG. 1B we will illustrate how soft handoff occurs in today's network. A user's mobile unit 20 is communicating with its serving base station $10_5$ in the corresponding cell $21_5$. The base station $10_5$, and probably mobile 20, monitor the signal strength of the mobile unit 20 and when the mobile's signal strength drops below a pre-specified level soft handoff is initiated. That is, as the mobile enters the soft handoff region 33, the base station $10_5$ and the mobile unit 20 together initiate the appropriate steps through a base station controller 35 and a mobile switching center 40, if necessary, in circuit switched network 47 to locate the target base station $10_6$ for the neighboring cell $21_6$ serving the same soft handoff region 33. Note that the mobile switching center would not be included in soft handoff, given the current illustrative example, because both base stations are controlled by the same base station controller. Identical information intended for the mobile unit 20 is then routed to both the target base station $10_5$ and the serving base station $10_6$. Both base stations in turn transmit the identical information to mobile unit 20. The mobile unit 20 then combines the signal to produce the information intended for the user. As the mobile unit 20 leaves the soft handoff region 33 and enters the target cell $21_6$, soft handoff is terminated and the target base station $10_6$ becomes the only base station serving the mobile unit 20. In a similar manner the mobile unit is handed from base station to base station as the unit roams from cell to cell.

It is important to note that the backbone of the network of FIG. 1B is entirely circuit switched. It is also important to note that in order for the mobile unit to combine the signals that are received during soft handoff, the signals must be identical at the physical layer and synchronized. In FIG. 1C we further illustrate the impact of requiring that identical data be present at the physical layer during soft handoff in today's centralized network. As FIG. 1C shows, in the forward direction or downlink (from base station to mobile station), a centralized Selection and Distribution Unit (SDU) 60, typically residing in a mobile switching center, is responsible for distributing traffic, over layer-2 circuits, via different base stations to the mobile station and ensuring that the matching link-layer (and physical-layer) frames sent to different base stations, $10_5$ and $10_6$, contain copies of the same data, i.e., data content synchronization. In the reserve direction, the mobile station ensures that the matching link-layer frames sent to different base stations contain copies of the same data.

The mobile station must also collaborate with the base stations to synchronize the radio channel frames received (and transmitted) by the mobile station, i.e., frame synchronization.

In the forward direction, the mobile station combines the radio signals received in the matching frames from different base stations to generate a single final copy of each piece of received data. In the reverse direction, the SDU combines the matching data received from different base stations, data content combination.

Ultimately the network architecture of FIG. 1B will transition to the IP-based autonomous wireless base stations network of FIG. 1D. In comparing the architecture of FIG. 1D to FIG. 1B, we note the following important differentiating features of FIG. 1D: (1) base stations 100 function autonomously, i.e., there are no base station controllers or mobile switching centers to centrally control the base stations; (2) the backbone network 107, including connections 117 that interconnect the base stations 100, is an all IP network, as opposed to a circuit switched network; and (3) the base stations are capable of performing IP layer processing, e.g., forwarding packets based on information in the IP headers, signaling, and mobility management. Because the base stations 100 function autonomously and are interconnected via an all IP backbone network 107 prior art methods will not support soft handoff in the network of FIG. 1D.

There is a need therefore for methods, systems, and circuitry for supporting soft handoff in an IP-based autonomous wireless base station network. Specifically, such methods, systems, and circuitry must meet the following requirements for supporting soft handoff:

1. Separate copies of the same data need to be sent by different base stations to the same mobile simultaneously and in the reverse direction the mobile unit needs to ensure that the same data is sent to the base stations, i.e., data content synchronization,
2. A mobile station's radio system has to be able to recognize which of the radio frames carrying data from different base stations contain copies of the same data so that it may synchronize the frames for combining the data content, i.e., frame synchronization, and
3. A mobile station should be able to combine copies of the same IP packet into a single packet and present the combined packet to the applications, i.e., data content combination.

SUMMARY

Our invention supports soft handoff in an IP based autonomous wireless base station network.

Broadly, our invention in one aspect is a method wherein network information processing at one layer is done remotely, distributed to other applicable resources that do not replicate the remote processing done at that layer, and then routed by such other resources to a final destination. We refer to this aspect of our invention as remote layering because layer processing for a first resource or node is done remotely at a second resource or node. In this way, a base station can function autonomously, to support soft handoff without the need for a centralized unit to distribute traffic to multiple base stations and to select copies of traffic sent by a mobile via multiple base stations into the backbone network, thereby increasing network efficiency. In the context of a packet switched backbone network, such as an IP-based wireless network having autonomous base stations, remote layering allows a first base station to process the information at a layer, assemble that information into a protocol data unit or packet corresponding to the layer, copy the assembled packet, and send a copy of the packet to a second base station. The second base station then relays the packet to a mobile unit without replicating the processing previously done at the first layer by the first base station. As such, an IP-based wireless network can support soft handoff without the need for any centralized control. Remote layering by obviating the need for central control, as done in the prior art, increases network efficiency.

In another aspect of our invention we provide a method and concomitant circuitry for sending or transporting the copy of the assembled packet or protocol data unit from the first base station to the second base station. We refer to this aspect of our invention as cross-layer switching. In accordance with cross-layering switching a protocol data unit prepared at a first node or base station is copied. To the copy is added a label that corresponds to a channel for a mobile unit. The labeled copy is then encapsulated in another packet, e.g., an IP encapsulating packet, and sent to a second base station. At the second base station the encapsulated packet is then disassembled and the label used to relay the protocol data unit to the mobile. Cross-layer switching uses one layer of a protocol stack to route and switch information of another layer.

In accordance with remote layering and cross-layer switching we provide a method for meeting the data content and frame synchronization requirements necessary to support soft handoff in an IP based autonomous wireless base station network.

In accordance with yet another aspect of the present invention we provide a method and concomitant circuitry for meeting content combination requirements necessary to support soft handoff in an IP based autonomous wireless base station network. We refer to this aspect of our invention as Head-of-Line Locking. In accordance with Head-of-Line Locking N data blocks received at a mobile from a first base station and a second base station are compared to find the first pair of matching data blocks in the first N≧3 consecutive data. Once a match is found the mobile begins data combination thereby performing soft handoff.

In combination the above aspects of our invention are utilized to support soft handoff in an IP based autonomous wireless base station network.

Our proposed method can be easily expanded to support macro diversity or site diversity. Macro diversity allows a mobile station to receive data from multiple base stations at the same time. Macro diversity has been shown to be effective for increasing wireless transmission quality and system reliability, especially for the case of the so-called "shadowing" in an urban environment. Our new soft handoff method can be readily used to achieve macro diversity when the wireless base stations are IP-based autonomous base stations that use CDMA radio technologies.

BRIEF DESCRIPTION OF THE DRAWINGS

FIG. 1C illustrates soft handoff in the network of FIG. 1B;
FIG. 2A illustrates the concept of remote layering in accordance with the present invention;
FIG. 2B is a diagram of one specific illustrative embodiment of our invention.

DETAILED DESCRIPTION

Figure 1A:
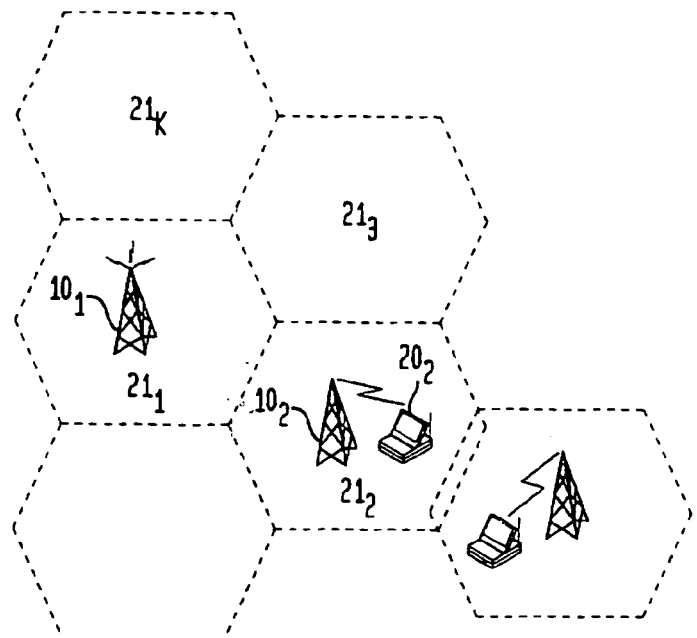
FIG. 1A illustrates a typical cellular network.
Figure 1B:
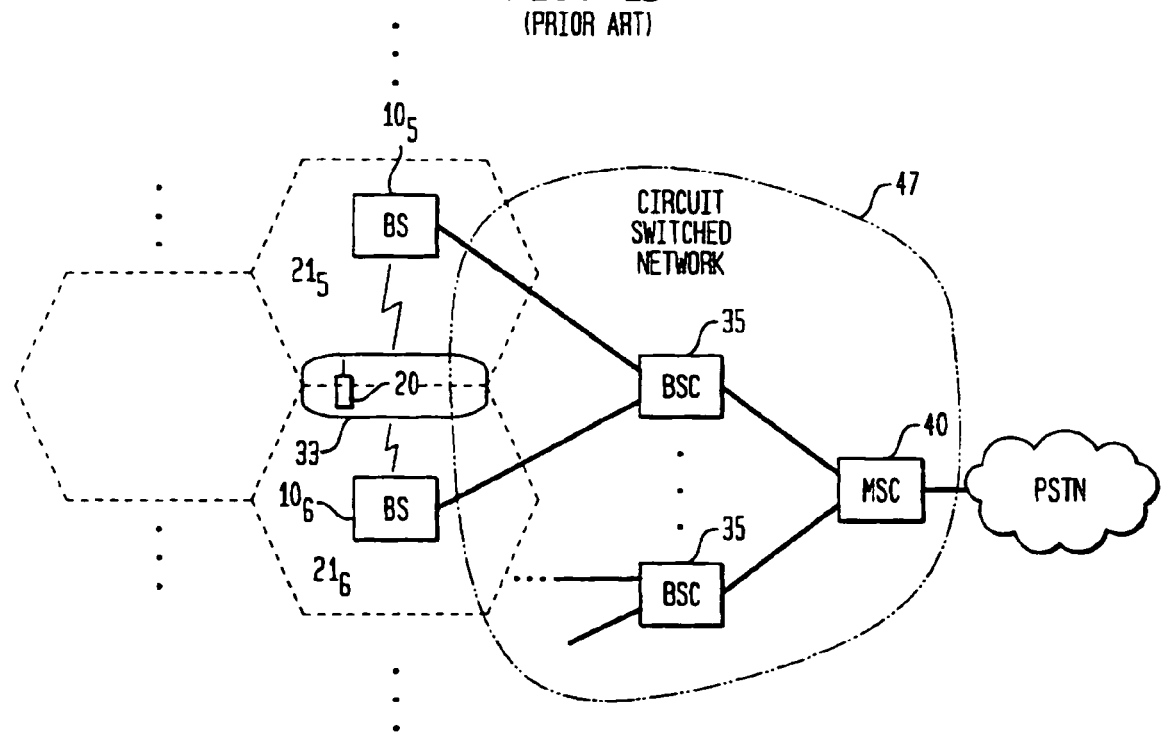
FIG. 1B depicts a prior art network executing soft handoff.
Figure 1D:
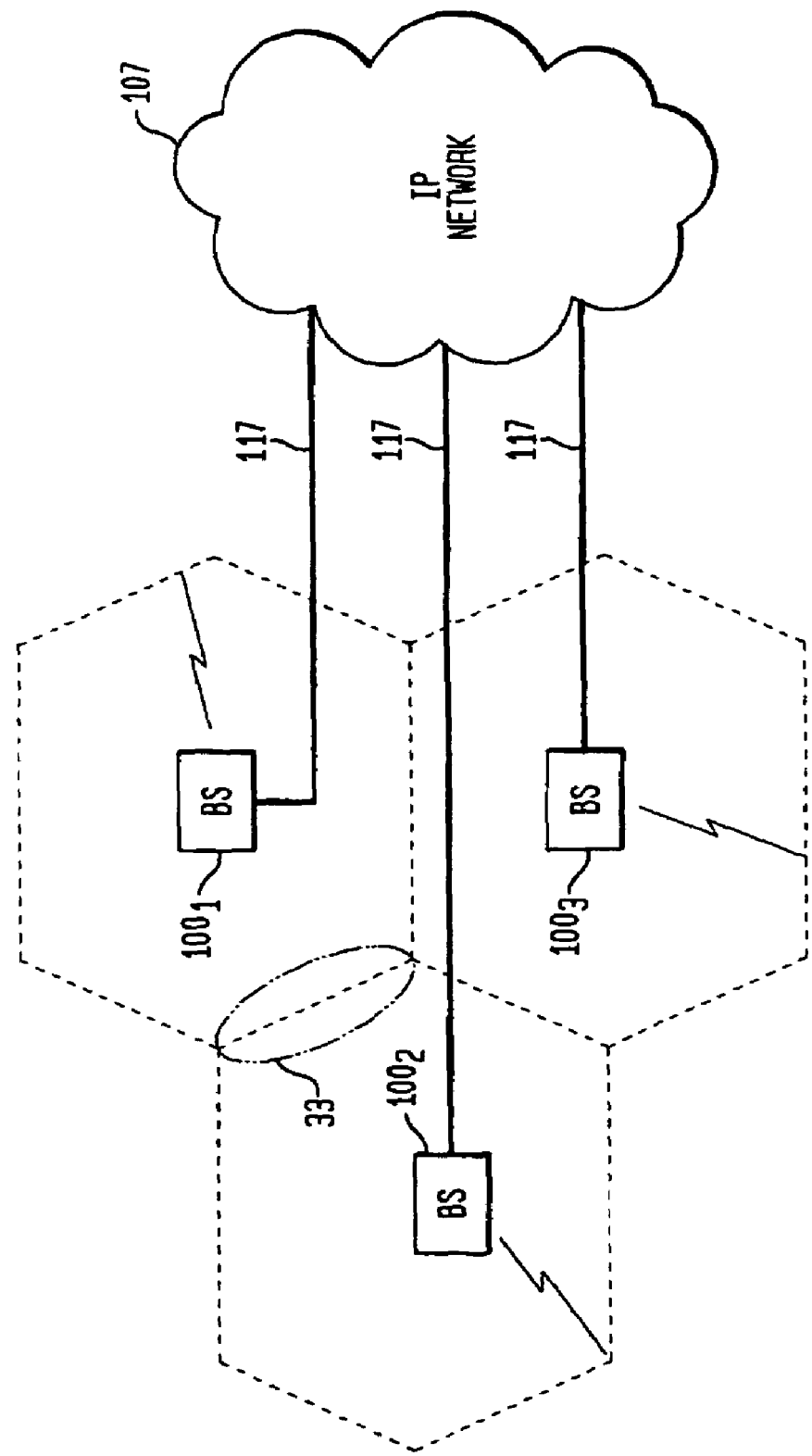
FIG. 1D illustrates a future Internet Protocol (IP) based autonomous wireless base station cellular network.

In the discussions to follow we will again refer to different layers of the 7-layer Open System Interconnect reference model wherein the layers are ordered as follows: layer 1 is the physical layer and the lowest layer in a stack, layer 2 is the link layer and above layer 1, layer 3 is the network layer and above layer 2, layer 4 is the transport layer and above layer 3, layer 5 is the session layer and above layer 4, layer 6 is the presentation layer and above layer 5, and layer 7 is the applications layer and the highest layer.

Before delving into the different aspects of the present invention it will prove instructive to further consider and describe additional problems of soft handoff in a network comprising IP-based autonomous wireless base stations.

Mobile stations served by different base stations may have to use disjoint sets of IP addresses when receiving and transmitting data in a packet switched backbone network, such as an IP based network. This, for example, is likely to be the case when mobile stations are served by different base stations belonging to different IP subnets; as those skilled in the art will recognize, a mobile station may often be served by base stations in different subnets given the geographic manner in which IP addresses are assigned. In such cases, today's approaches for IP over W-CDMA and CDMA-2000 networks will cause packets sent from different base stations to the same mobile station to carry different destination IP addresses. Consequently, the mobile station's radio system, which operates at protocol layers below the IP layer (the third layer in the 7-layer OSI reference model), will not be able to determine whether two pieces of data, each arriving from a different base station, are copies of the same data. This would preclude the requirements for frame synchronization and data combining necessary to achieve soft handoff.

In today's centralized CDMA networks, data content synchronization is achieved using a centralized control entity, the Selection and Distribution Unit (SDU), as discussed above. In particular, the SDU ensures that data contents carried in matching frames sent to different base stations are copies of the same data, and a base station controller ensures that the data contents carried in matching frames sent to different base transceivers station (BTS) under its control are copies of the same data. In autonomous IP-based wireless base stations, centralized control entities will no longer exist. Consequently, even though the CDMA radio system is capable of synchronizing the link and physical layer frames on the radio channel, it cannot guarantee that the matching frames from different base stations will carry copies of the same data. This is so because copies of the same IP packet may arrive at different base stations at different times and may be transmitted by the base stations to the mobile station at different times. As a result, the mobile station's radio system may not be able to determine which frames received from different base stations contain copies of the same data. This would violate data content and frame synchronization requirements.

Transporting IP packets over CDMA networks (or over any other network) requires a link layer protocol that is capable of packet encapsulation/framing, i.e., the ability to re-assemble IP packets at the receiving host. Today, for example, most proposals for IP-based CDMA networks use the Point-to-Point Protocol (PPP) defined by the Internet Engineering Task Force (IETF) for this purpose. However, link layer protocols like PPP could, without further innovations, make soft handoff impossible in many cases. For example, a single PPP connection, even when the PPP Multilink Protocol is used, cannot support multiple simultaneous copies of the same traffic stream between a base station and a mobile. Although multi-link PPP can be modified to transport multiple copies of the same data simultaneously via different base stations to the mobile station, this cannot solve the data content synchronization problem. If multiple PPP connections are used (regardless on which base station each of these PPP connections terminates) to connect the mobile station to different base stations, multiple copies of the same packet will have to be delivered to the IP layer and the transport layer (i.e., the UDP and TCP layer or layers three and four of the 7-layer OSI reference model). This will force every application that uses UDP (which is incapable of handling duplicate packets) to be specially programmed to handle frequent duplicate packets. This would preclude the mobile from being able to perform the combining function as required.

We will now turn to our method for achieving soft handoff between IP-based autonomous based stations that will overcome the described limitations of the prior art. In addition, our method may also be used to significantly reduce, if not eliminate, the extra handoff latency caused by a mobile unit or station changing its IP address.

We generally refer to our method as remote layering. By remote layering, we mean performing some or all of the functions of a protocol layer on a different (remote) processor or computer. With remote layering, some or all of the functions of a protocol layer X on a node A for interfaces to a node B can be performed on a remote node C. For example, and by reference to FIG. 2A, the remote node C will determine how upper layer packets 202 should be assembled or packed into layer X protocol data units (PDUs) 204. The layer X PDUs 204 are then transmitted to node A which in turn transports the layer X PDUs 204 to node B. Node A may be responsible for other layer X functions, e.g., re-transmissions of layer X PDUs 204 when needed. For the traffic generated by remote layering of layer X, node A will act as a layer X relay point for those layer X PDUs. In other words, node A relays the layer X PDUs 204 generated by node C to node B in a way that node B will not know that the layer X PDUs 204 were generated by node C. Node C at the same time may be a higher or lower layer processor for other traffic. For example, in the context of IP-based CDMA networks, an IP-based base station or node A will perform IP-layer processing ordinarily. However, if a link layer protocol, such as Radio Link Protocol, is performed at remote base station or node C for node A's interface to mobile station B, then base station A will act as a RLP-layer relay for traffic destined for B that is processed by remote layering on base station C.

Therefore, in a broad sense, our invention, remote layering, is the idea or concept that in a network information processing at one layer is done remotely, distributed to other applicable resources that do not replicate the remote processing done at that layer, and then routed by such other resources to a final destination. In this way, resources can function autonomously, thereby increasing network efficiency.

In the context of an IP-based CDMA network remote layering allows base stations to function autonomously yet while supporting soft handoff. Specifically, and with reference to the specific embodiment depicted in FIG. 2B, remote layering occurs as follows. While a mobile station 20 is in the soft handoff region 33 its serving base station or first node 210, transmits layer 2 data packets 212 to the mobile 20. Note layer 2 data packets are layer 2 protocol data units or PDUs and throughout the remainder hereof we use the term PDU and data packets interchangeably. A PDU is a data object having both data and control information exchanged by protocol entities at different protocol layers per the OSI 7 layer reference model.

In addition to transmitting layer 2 PDUs to the mobile, serving base station $210_1$ copies layer 2 data packets 212 and encapsulates the copy in IP packets 214. Copying and encapsulation may be performed at base station $210_1$ by remote layer processor 213; alternatively, copying and encapsulation may be achieved by other arrangements as is discussed below. The encapsulated packets 214 have the IP address for a target base station or second node $210_2$ and are transmitted over the IP network 107 to the target base station $210_2$.

As they arrive at the target base station $210_2$ the target base station then obtains the copy of the layer 2 data packet $212_c$ by use of a processor 217 at target base station $210_2$. Target base station $210_2$ then transmits data packet $212_c$, which is an identical copy of packet 212, to the mobile 20 over the air. Simultaneously, the mobile 20 receives the packet 212 transmitted by the serving base station $210_1$. Packets 212 and $212_c$, because they are identical, can now be combined by the mobile 20 using data combiner or processor 230 and used for soft handoff.

Those of ordinary skill in the art will note that in accordance with our inventive concept because the serving base station processing includes copying data packets intended for a mobile at layer 2, the link layer, but before layer 1, identical packets are available at the mobile unit. In addition, it is noted that remote layering can be extended to the case where there is more than one target base station. For example, if CDMA 2000 technologies are used, the Radio Link Protocol (RLP) layer processing for the serving base station $210_1$ and all the target base stations 210 can be processed once by the serving base station $210_1$. The serving base station $210_1$ will then send copies of the resulting or processed protocol data units $212_c$ (as encapsulated in 214) to each of the target base stations 210. In accordance with our invention, the target base stations 210 do not perform RLP layer processing for the soft handoff traffic. Instead each target base station maps the content of each received RLP frame $212_c$ received from the serving base station into the matching local RLP frame used to send data over the air to the mobile. In this particular illustrative embodiment a matching local RLP frame is a frame that has the same RLP frame sequence number as the sequence number carried in the RLP frame received from the serving base station.

Note also that the functions attributed to processor are not meant to limit implementations to a separate processor. That is, processors already resident in a base station may be modified or augmented to perform the functions required in accordance with our invention.

As seen in FIG. 2B, with remote layering, soft handoff traffic will flow from the serving base station through multiple base stations to the mobile station over a single virtual radio-dependent link-layer (e.g., RLP layer) connection. This virtual connection originates from the serving base station and terminates at a mobile station; the virtual connection may have many have many multiple branches, each of which traverses one target base station. Remote layering is a powerful way for achieving synchronization of data contents sent to the mobile from different base stations—a key problem to be solved in order to realize soft handoff and macro diversity in CDMA networks that use IP-based autonomous base stations. In particular, if RLP processing for all base stations involved in a soft handoff is performed on the serving base station, the serving base station and the target base stations can easily ensure that the data contents carried in the matching RLP frames sent by different base stations to the mobile carry copies of the same data.

Figure 3:
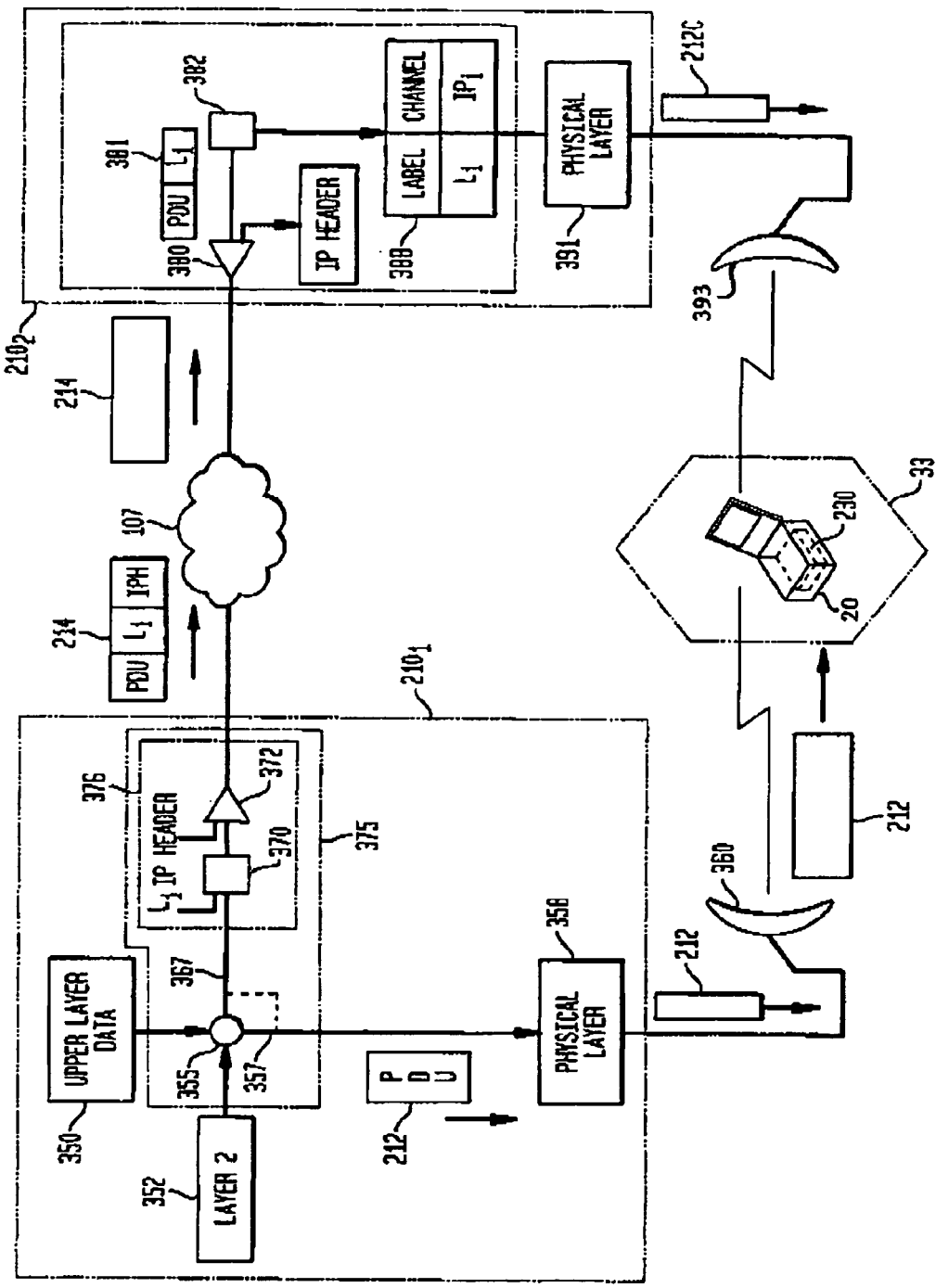
FIG. 3 is a diagram of another specific illustrative embodiment of our invention.

Above we described our remote layering method and one illustrative embodiment wherein processors 213 and 217 may be used to implement the method. FIG. 3 depicts a further embodiment which illustrates another aspect of our invention. We refer to this aspect of our invention as cross layer switching. In general, by cross layer switching, we mean an IP node (e.g., an IP-based wireless base station) switches traffic from an incoming link to an outgoing link when data transported on the incoming and outgoing links are implemented using technologies at different protocol layers. In the embodiment of FIG. 3, cross-layer switching occurs between a serving base station $210_1$ and a target base station 2102. At base station $210_1$ upper layer data 350 is combined with layer 2 data 352 by a processor 355 to form packet data unit 212. One output 357 of processor 355 is coupled to a physical layer processor 358 where it is prepared for over the air transmittal by antenna 360. Antenna 360 sends the packet over the air where it received by mobile 20.

The other output 367 of processor 355 is routed to label adder or multiplexer 370 where label $L_i$ is added to the packet data unit 212. Processor 355 includes means for adding layer 2 data to upper layer data or packets 350 and means for providing replicas of the upper layer data. Note however that processor 355 could operate simply by taking a data packet from one layer, and processing it to produce a data packet at another layer, and coupling its output to adder 370.

An IP header is then added to the output of adder 370 by multiplexer 372 to form encapsulating IP packet 214. Note that packet 214 is a packet comprising packet data unit 212, a switching label, $L_i$, encapsulated in an IP packet having an IP destination address IPH corresponding to the target base station. The import of switching label $L_i$ is discussed below. It also should be noted that our label switching method may be easily adapted to include more than one target base station.

Adder or multiplexer 370 and multiplexer 372 perform the function of packet data multiplexing or assembling. That is, given a packet data unit the multiplexers further packetize that information by adding the label $L_i$ or the IP header. We wish to note however, that multiplexer 370 does not need to perform all the functions normally associated with data packet multiplexing; at minimum multiplexer 370 need only function as an adder whereby $L_i$ is added to the layer 3 PDU so other functions such as segmentation are not required of this element, hence it functions only as adder 370. Elements 370 and 372 typically include a hardware software combination. In any event, in using the term "multiplexer" we mean to only signify the operation of taking a first set of data and adding another set of data to form a second set of data; indeed it may be possible to perform the entire operation in software or firmware. We wish to also point out that processor 355 similarly includes the function of taking upper layer data and adding a second set or layer of data and assembling the result in a packet having the proper header and trailer information. Moreover, note that multiplexers 370 and 372 and processor 355 need not be implemented in separate devices but may be combined into a single device as shown by block 375, i.e. a remote layer processor. Alternatively, the functions of data multiplexers or assemblers 370 and 372 may be combined into a single device as shown by block 376.

As encapsulating IP packet 214 arrives at target base station $210_2$ after traversing IP network 107, it enters a demultiplexer 380 which by its output provides data packet 381 comprising switching label $L_i$ and packet data unit 212. The output of demultiplexer 380 is then further demultiplexed by demux 382 so that label $L_i$ may be used to determine, via look-up table 388, the outgoing channel corresponding to mobile 20 having the IP address $IP_i$. At this point the physical layer processor 391 transmits packet $212_c$, an identical copy of packet 212, over the air via antenna 393 to mobile 20. As such, mobile 20 has two identical packets for combining as part of soft handoff processing.

With respect to implementation details of demultiplexers 380 and 382, they essentially perform the inverse functions of 372 and 370, respectively. Specifically, demultiplexers 380 and 382 strip away the appropriate control information on the arriving packet, i.e., disassembling, ultimately allowing access to the underlying data, in this case a copy of PDU 212. Multiplexers and demultiplexers capable of performing these functions are common in the art and any element that provides the functions described herein will be suitable.

In addition, although we have depicted label $L_i$ as separate data within packet 214 it may be possible to include the label information in unused bytes as part of the protocol data unit or as part of IP encapsulation. For example, if there are unused bytes in the IP header, these bytes could be used to transmit a label. In general, the important function is that of communicating to the target base station the IP address of the mobile unit so that the target base station can correctly identify the mobile unit. Accordingly, as described above, adding a label in any manner will suffice.

As an aid to further understanding cross layering switching and the discussions above we will assume that remote layering is done at the link layer using the Radio Link Protocol. Accordingly, packet data unit 212 will comprise an RLP packet data unit. In effect, IP tunnels capable of transporting encapsulated non-IP data will be established between serving and target base stations and used to transport RLP PDUs from the serving base station to a target base station. RLP PDUs destined to different mobile stations will be identified by different labels, $L_i$. A label can be any identifier that identifies the outgoing connection on the target base station for the encapsulated data. In our example it could be the IP address used by the target base station to identify the outgoing RLP channel to a mobile station. The target base station uses the labels carried in the encapsulating IP packets to determine which outgoing RLP channel each incoming RLP PDU should be sent to. For this purpose, each participating base station maintains a table that maps each label to an outgoing RLP channel. As seen in FIG. 3 the encapsulated data carrying label $L_i$ should be routed to the outgoing RLP channel to a mobile station with IP address $IP_i$. Once the outgoing RLP channel is identified, the target base station will copy the data contents of the incoming RLP PDUs (not the entire incoming PDU) into the proper outgoing RLP channel frames. This accomplishes cross layer switching from an IP layer tunnel to an RLP layer channel.

The cross layer switching method described above makes it possible to perform the functions of protocol layer X on a remote computer, transport the resulting PDU of protocol layer X to the local computer, and map the data content of these PDUs into the local PDU frames of protocol layer X so that location of protocol layer X processing is transparent to the mobile users thereby accomplishing remote layering.

By remotely processing the data intended for the same mobile remotely using cross layer switching we have demonstrated that indeed an IP-based autonomous base station wireless CDMA network can be made to achieve data content and frame synchronization. Specifically, Remote Layering and Cross Layer Switching ensure that the radio-dependent link layer (e.g., the RLP layer) and the physical layer frames arriving from different base stations will carry copies of the same data if the frames are matching frames (e.g., frames with the same sequence number). For simplicity, we refer herein to radio-dependent link layer frames and physical layer frames as radio frames or frames. However, random transport delays between base stations can cause the matching frames to arrive at different target base stations at different times and eventually to arrive at the mobile station at different times. Data may also be lost on its way to the mobile station. Existing synchronization capabilities in CDMA mobile station can synchronize the radio channels but is incapable of determining whether the contents of two frames from different base stations are copies of the same data.

If the mobile station's radio system can interpret the sequence numbers carried in the radio frames before combining data coming from different base stations, no further processing is required for data content synchronization. This is because Remote Layering and Cross Layer Switching ensure that the radio frames from different base stations will carry copies of the same data if the frames are matching frames (e.g., frames with the same sequence numbers). The base stations can inform the mobile station how to determine which frames are matching frames. For example, matching frames may be frames with the same sequence numbers. Or, frame with sequence number K from one base station may match with the frame with sequence number (K+M) from another base station, where M is a constant. In this case, the mobile station only need to synchronize the radio frames and that may be done using the channel synchronization techniques available in today's CDMA mobile stations.

The procedure used in CDMA systems to combine different signal streams at a mobile often may not be able to interpret the sequence numbers carried in the radio frames. In this case, the base stations may inform the mobile station of the time shift of the matching frames. For example, the base stations may inform the mobile station that each frame from one base station matches with the frame arriving T time units later from another base station. The mobile station may use the time shift to synchronize the matching frames. Accurate time shifts for data content synchronization may be difficult to determine in high-speed radio systems. Furthermore, it requires extra processing on the base stations and extra information exchange between the base stations in order for the base stations to determine the time shift of data content, which can often be difficult in autonomous base stations. In this case, we propose a method for the mobile station to synchronize the data contents coming from different base stations. The approach is referred to as Head-of-Line Locking. The approach works by detecting the first pair of matching data contents (hence the term head-of-Line) coming from two different base stations. Once the first matching pair is found, Remote Layering and Cross Layer Switching ensure that the following matching frames will always carry copies of the same data. In other words, data content synchronization is achieved once the first pair of matching data contents are found (hence the term Head-of-Line Locking). Therefore, the radio system of the mobile station can start to use any existing techniques to combine the data in the following radio frames without having to know the sequence numbers of these frames.

Figure 4:
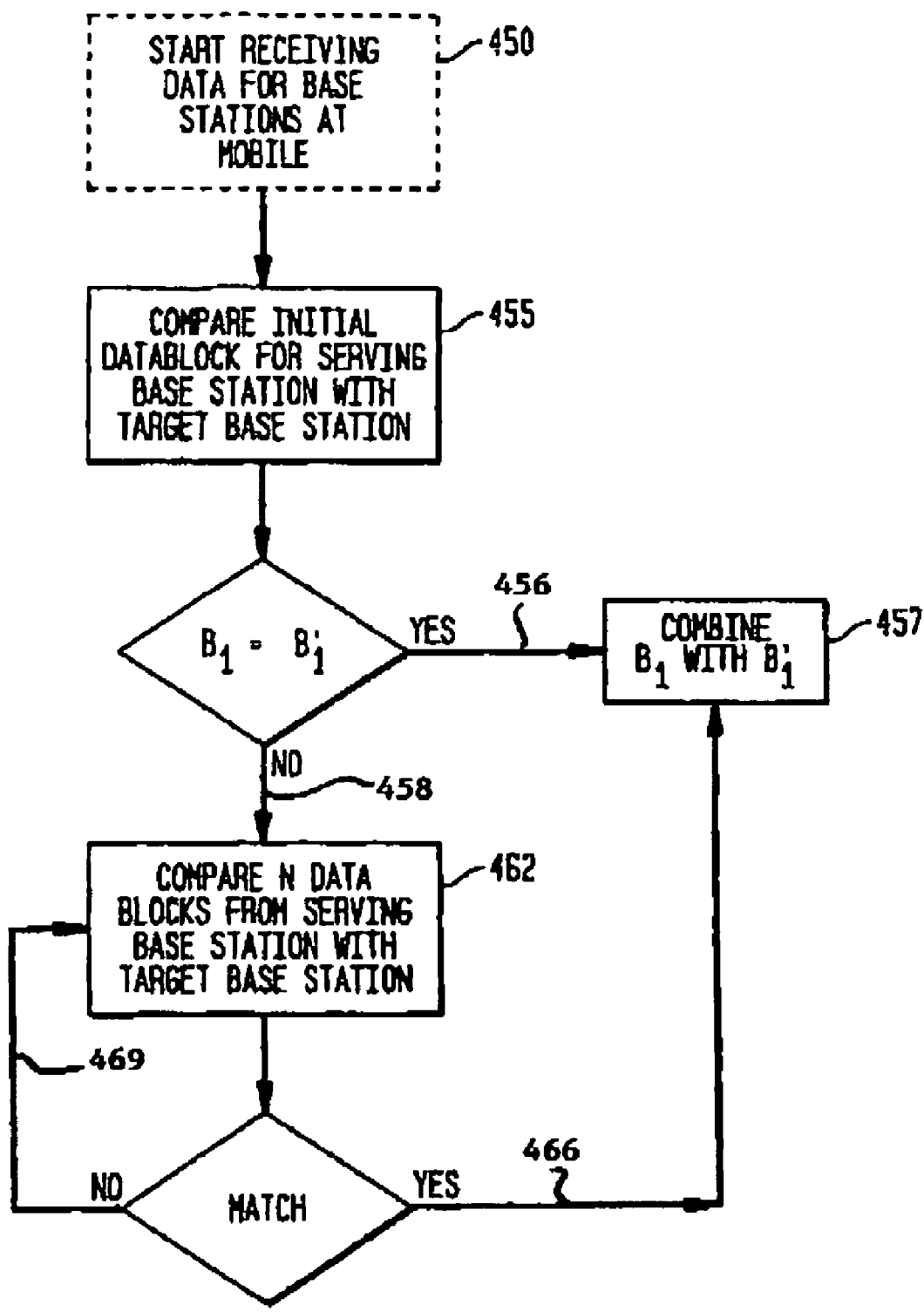
FIG. 4 is a flow diagram of the Head-of-Line Locking process in accordance with an aspect of this invention.

Turning to FIG. 4, the Head-of-Line Locking process begins at step 450, at time to for example, with the mobile station being instructed to start receiving data from its serving and target base stations. Assume that the first data block arriving after time $t_0$ is $B_1$ and, without loss of generality, that $B_1$ is received from the serving base station. Note that step 450 is optional with regard to performing Head-of-Line Locking and is merely used to illustrate a trigger for this aspect of our invention. Essentially Head-of-Line Locking may begin once a mobile receives data from its serving and target base stations.

The mobile station, upon receipt of the next data block $B_1$ from the target base station, then, at step 455, compares the contents of $B_1$ and $B_1$. The result of this comparison determines whether further comparison is needed. Specifically, if there is a match (line 456), then the two streams of data blocks are synchronized and therefore the mobile station begins soft handoff signal by combining $B_1$ and $B_1$ as indicated at step 457. If no data blocks are lost inside the wireless and the wireline networks, data blocks $B_1$ and $B_1$ should match because they are copies of the same data.

If there is a mismatch (line 458) between the initial data block from the target and serving base station then a second comparison takes place at step 462.

To handle potential loss of data blocks, at step 462, the head-of-Line Locking approach seeks to find the first pair of matching data blocks in the first $N \geq 3$ consecutive data blocks received from the serving and target base stations. Note that the first N data blocks received by a mobile station do not necessarily have to be the first N data blocks transmitted by a base station because of potential data block loss. Starting from the first data block received from one base station (either the serving or target base station), the mobile compares the data block with each of the first N data blocks received from the other base station, step 462. If a match is found (line 466) for all of the first N received data blocks that are compared, then the mobile begins data combining at step 457. If there is no match (line 469) the process returns to step 462 and is repeated.

It can be proved that our Head-of-Line Locking process or method will always find, within the first N received data blocks, the first matching pair of data blocks if no more than half of the first N data blocks sent via each base station are lost. This should be the case in most wireline or wireless networks. Typically, we expect N=3 should be sufficient in most cases. However, as long as N is an odd integer Head-of-Line locking will work. In fact, N would probably be greater than 3 for asynchronous CDMA networks. In a synchronous CDMA network such as CDMA 2000, setting N=3 may indeed prove sufficient.

Content comparison for the first N received data blocks may be done in radio wave forms or in the form of decoded bit sequences.

Having described remote layering, cross-layering switching, and head-of-line locking we will now, for clarity, illustrate how these three aspects of our invention may be used to accomplish soft handoff.

Figure 5A:
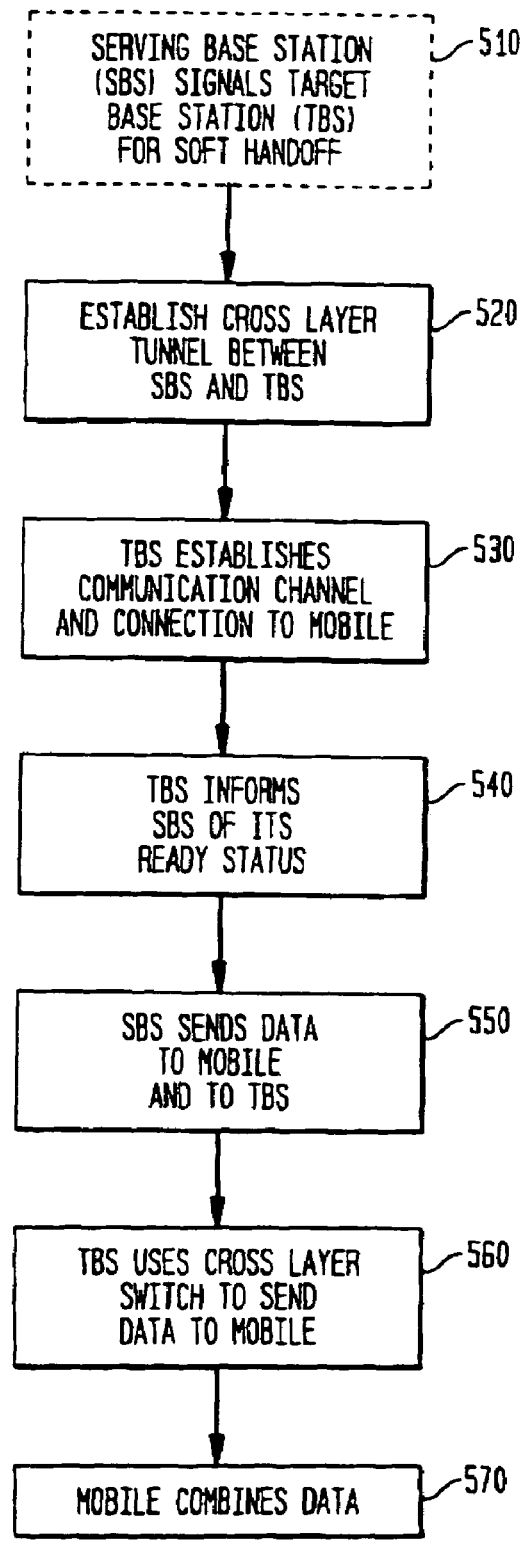
FIG. 5A is a flow diagram of one illustrative embodiment of the method in accordance with the present invention to achieve soft handoff.

We assume that the base station transceivers and mobile stations use existing mechanisms to determine when to start the soft handoff procedure. Turning then to FIG. 5A there is illustratively depicted the method steps for achieving soft handoff for the forward link, from the base station to the mobile. At step 510, the serving base station (SBS) signals the request for soft handoff to the target base station. Signaling messages are transported as standard IP packets. Note that step 510 is optional in that our method operates regardless of how the mobile, serving base station, and target base station communicate a request to begin soft handoff.

At step 520, the two base stations will establish a cross-layer-switched IP tunnel between them (if no such tunnels already exist) once the serving and the target base stations agree to perform soft handoff for a mobile station. Cross-layer-switched IP tunnels can be established and torn down on demand. Alternatively, they can be kept alive for extended period of time to support future soft handoff traffic because the cross-layer-switched IP tunnels themselves consume little or no network resources.

While the inter-base station IP tunnel is being established, the target base station will establish, step 530, a physical radio channel and a radio-dependent link-layer connection to the mobile station. The radio-dependent link-layer connection will be able to transport upper layer data in fixed-size frames. The length of the frames used by the serving and the target base stations will be set to be the same by signaling or configuration. The link layer protocol for implementing this link-layer connection should be the same on all base stations. The RLP in CDMA 2000 system is an example of link-layer protocols that satisfy these requirements.

After the connection to the mobile station is established, the target base station informs the serving base station that the target base station is ready to deliver data to the mobile station, 540. The serving base station will then instruct the mobile station to start receiving data from both base stations. Any other method may be used for the base stations to exchange their readiness status for handling soft handoff traffic. Furthermore, any other method may be used for the base stations to communicate to the mobile station when the mobile station can start receiving data from both base stations.

Figure 5B:
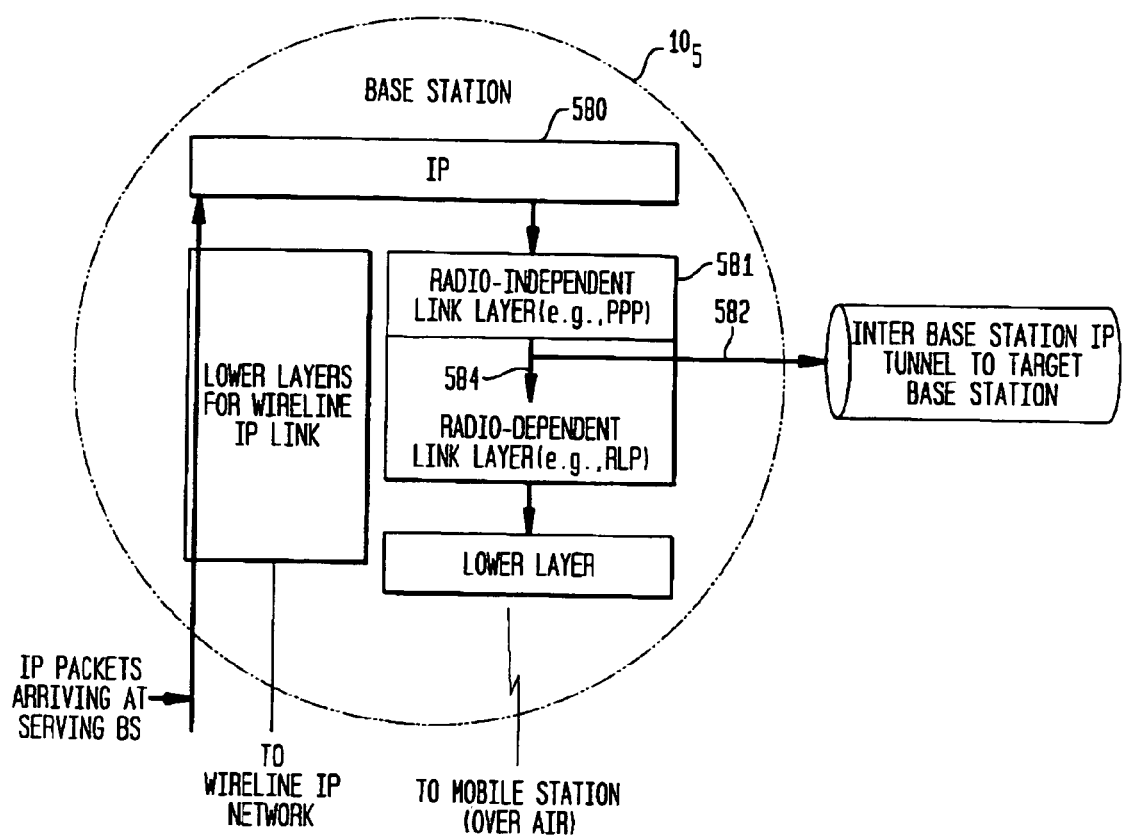
FIG. 5B illustrates the protocol architecture and data flow in accordance with an aspect of the present invention.

At the serving base station, the incoming IP packets that are destined to the mobile station will be sent down the protocol stack for transmission to the mobile station, step 550. For further clarity we will now turn to FIG. 5B to illustrate the protocol architecture and data flow in accordance with our invention. As illustrated in FIG. 5B, at a serving base station $10_S$ data from the IP layer 580 is sent down the protocol stack to the top most radio-dependent link layer (e.g., RLP layer) 581. Copies of the incoming data will be made and sent over different branches of a virtual RLP-layer connection. To help achieve data content synchronization, copies of the same data is inserted in the matching frames (e.g., frames with the same RLP sequence number) over different branches, 582 and 584, that go to different base stations. Step 550 ensures that:

The mobile station does not need to change its IP address within the soft handoff region, even when the cell of the target base station belongs to a different IP subnet.

Soft handoff traffic does not have to use the radio-independent link layer protocol at the target base station. Therefore, soft handoff can be achieved regardless what radio-independent link layer protocols are used and whether they are the same on different base stations.

Data content sent via different base stations to the mobile can be easily synchronized.

Returning to FIG. 5A, at step 560 upon receiving and de-encapsulating a packet received from the tunnel, the target base station will use its label look-up table to determine which outgoing radio channel the data should be sent to. Then, it will map the data content into the matching local radio frames (e.g., frames with the same sequence number of the incoming frame from the tunnel) over the outgoing channel.

The mobile station, upon being instructed to receive data from the serving base station and the target base stations simultaneously, will start to synchronize the radio channels connecting to different base stations synchronize the data blocks received over these radio channels. Synchronization of data blocks is done to determine which data blocks received from different base stations are copies of the same data (these copies will be referred to as matching copies). Once synchronization is achieved the mobile is then combines the data from the serving base station with copies of the same data received from the target base station(s), step 570. We have not explicitly depicted data synchronization in FIG. 5B because we consider it a part of data combining as data synchronization and combination is usually performed by the same device as part of one process.

Steps 550 and 560 ensure that the matching radio-dependent link layer (e.g., RLP in CDMA2000 systems) and the physical layer frames arriving from different base stations will carry copies of the same data. Here matching frames, for example, are frames carrying the same sequence numbers. However, as discussed above random transport delays between base stations can cause the matching frames to arrive at different target base stations at different times and eventually to arrive at the mobile station at different times resulting in lost data. To overcome this problem, the base station uses the Head-of-Line Locking method previously described to achieve data content synchronization.

In the uplink direction, from the mobile to the base station, data streams are delivered over the reverse links to the serving base station and combined by the serving base station at the radio-dependent link layer before the data is passed upwards to the radio-independent link layer.

Our soft handoff method eliminates all the limitations of the prior art and further may eliminate the extra handoff latency or service establishment latency caused by changing IP addresses when mobile stations move into new cells. This is because cross-layer-switched IP tunnels eliminate the needs for a mobile to change its IP address while it is inside a soft handoff region. If a mobile station has to use a different IP address when it moves out of a soft handoff region into a new cell, the mobile may start the process of obtaining its new IP address while it is still inside the soft handoff region. If the mobile succeeds in obtaining the new IP address before it exits the soft handoff region, the mobile station may start to use the new address immediately after the mobile station leaves the soft handoff region. This will eliminate the extra latency of connection establishment caused by IP address change. The mobile station may also choose to start to use the new IP address while it is still inside the soft handoff region.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. A system for providing a soft handoff of a mobile from a serving base station to a target base station in an Internet Protocol based code division multiple access network, wherein said base stations are autonomous and without a centralized network entity that distributes user traffic to both the serving base station and the target base station, said system comprising
    means at said serving base station for combining upper layer packets with data at the link-layer to produce lower layer link-layer packets, for adding a label to said lower layer link-layer data packets to produce a remote layered link-layer data packet, and for adding a header to said remote layered link-layer data packet to produce an encapsulated Internet Protocol packet including a copy of said lower layer link-layer data packet unit;
    means at said serving base station for transmitting a data packet unit including said lower layer link-layer data packets from said serving base station to said mobile;
    means at said serving base station for transmitting said encapsulated remote layered data packet including said remote layered link-layer data packets to said target base station;
    means at said target base station for relaying said encapsulated remote layered data packet to said mobile without repeating the processing done at said serving base station for constructing said lower layer link-layer data packets; and
    means at said mobile for combining the lower layer link-layered packets of said copy of said data packet unit from said target base station with the lower layer link-layer packets of said data packet from said serving base station to effectuate the soft handoff.

2. A method for soft handoff of a mobile from a serving base station to a target base station in an Internet Protocol (IP) wireless packet switched network wherein said base stations are autonomous without a centralized control, said method comprising the steps of
    at the serving base station processing packets in the link-layer to produce a remote layered lower layer link-layer data packet that the target base station can use as if generated at the target base station and including lower layer link-layer data packets and adding an IP header to the remote layered link-layer data packet so as to create an IP encapsulated remote link-layer data packet;
    transmitting an IP encapsulated link-layer data packet from the serving base station to said mobile;
    transmitting from said serving base station said encapsulated link-layer data packet to said target base station;
    said target base station removing said remote layered link-layer data packet from said IP encapsulated remote layered data packet and relaying said removed remote layered link-layer data packet to said mobile; and
    combining at said mobile the link-layer packets of said data packet from said serving base station and the link-layer data packets from said removed remote layered data packet from said target base station.

3. A method for soft handoff of a mobile from a serving base station to a target base station in an internet Protocol (IP) based network wherein said serving and target base stations are autonomous without a centralized control, said method comprising the steps of:
    transmitting over air a data packet including lower layer link-layer data packets from said serving base station to said mobile;
    at said serving base station combining upper layer packets with data at the link-layer to produce lower layer link-layer packets, adding a label to said lower layer link-layer packets to produce a remote layered data packet, and adding an IP header to said remote layered data packet to produce an encapsulated IP packet including a copy of said data packet;
    sending from said serving base station to said target base station said encapsulated IP packet including said remote layered data packet through a cross layer tunnel between said base station and said target base station;
    said target base station removing said remote layered packet from said encapsulated IP packet and relaying said remote layer data packet to said mobile; and
    combining at said mobile the lower layer link-layer data packets of said data packet from said serving base station and the lower layer link-layer data packets of said remote layer data packet from said target base station.

4. The method in accordance with claim 3 wherein said lower layer link-layer data packets are layer-2 packets and wherein said step of combining at said mobile comprises the steps of
    comparing the lower layer-2 packets received from the serving base station with the layer-2 packets of the remote layer data received from the target base station;
    if said step of comparing indicates a match, then combining the data from said serving base station and the data from said target base station; and if said step of comparing does not indicate a match, then further comparing N data blocks from said serving base station with data from said target base station until a match is obtained.

5. The system in accordance with claim 1 wherein said means at said serving base station for combining upper layer packets with data at the link-layer to produce lower layer link-layer packets includes means for creating layer-2 packets from upper layer packets and putting a copy of each layer-2 packet in an upper layer packet.

6. The method in accordance with claim 2 wherein said step of processing packets in the link-layer at said serving base station to produce a remote layered lower data packet comprises creating layer-2 packets from upper layer packets and putting a copy of each layer-2 packet in an upper layer packet.

* * * * *

UNITED STATES PATENT AND TRADEMARK OFFICE
CERTIFICATE OF CORRECTION

PATENT NO. : 6,999,434 B1  
APPLICATION NO. : 09/723366  
DATED : February 14, 2006  
INVENTOR(S) : Agrawal et al.

Page 1 of 1

It is certified that error appears in the above-identified patent and that said Letters Patent is hereby corrected as shown below:

In the Drawings

In Fig. 2B, Sheet 5 of 9, for Tag "214", in Line 2, delete "ENCAPULATED" and insert -- ENCAPSULATED --, therefor.

In the Specification

In Column 8, Line 43, delete "210," and insert -- $210_1$ --, therefor.

In Column 9, Line 60, delete "210," and insert -- $210_1$ --, therefor.

In Column 12, Line 44, delete "to" and insert -- $t_0$ --, therefor.

In Column 12, Line 55, delete "$B_1$" and insert -- $B_1$' --, therefor.

In Column 12, Line 57, delete "$B_1$." and insert -- $B_1$'. --, therefor.

In Column 12, Line 61, delete "$B_1$" and insert -- $B_1$' --, therefor.

In Column 12, Line 63, delete "$B_1$" and insert -- $B_1$' --, therefor.

In the Claims

In Column 15, Line 44, in Claim 1, delete "comprising" and insert -- comprising: --, therefor.

In Column 16, Line 7, in Claim 2, delete "steps of" and insert -- steps of: --, therefor.

In Column 16, Line 61, in Claim 4, delete "steps of" and insert -- steps of: --, therefor.

In Column 16, Line 62, in Claim 4, delete "lower layer-2" and insert -- layer-2 --, therefor.

Signed and Sealed this  
Sixteenth Day of December, 2014

Michelle K. Lee  
*Deputy Director of the United States Patent and Trademark Office*